Inventors:
Walter Von Stoeser
Herman L. Seiden
By
Atty.

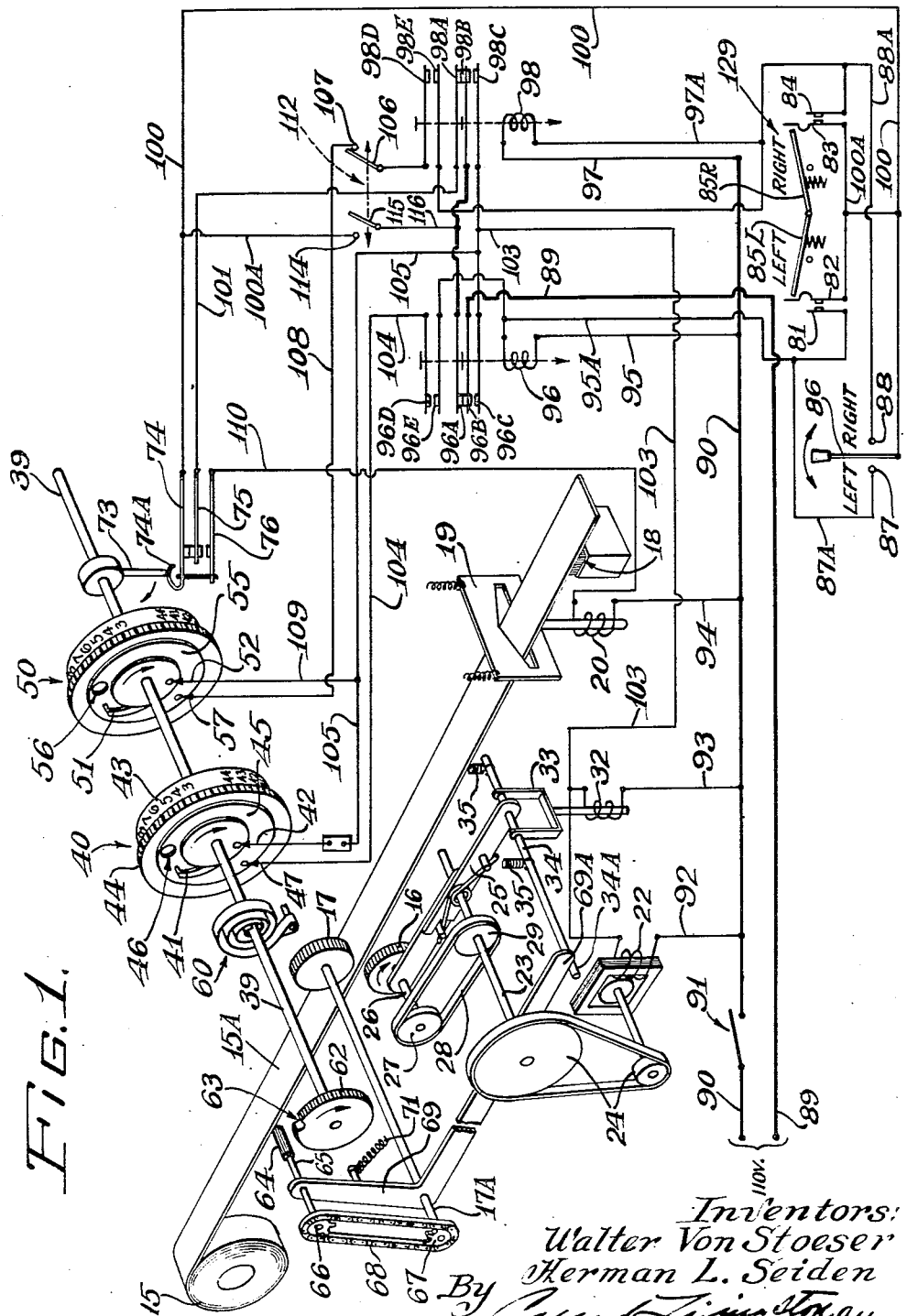

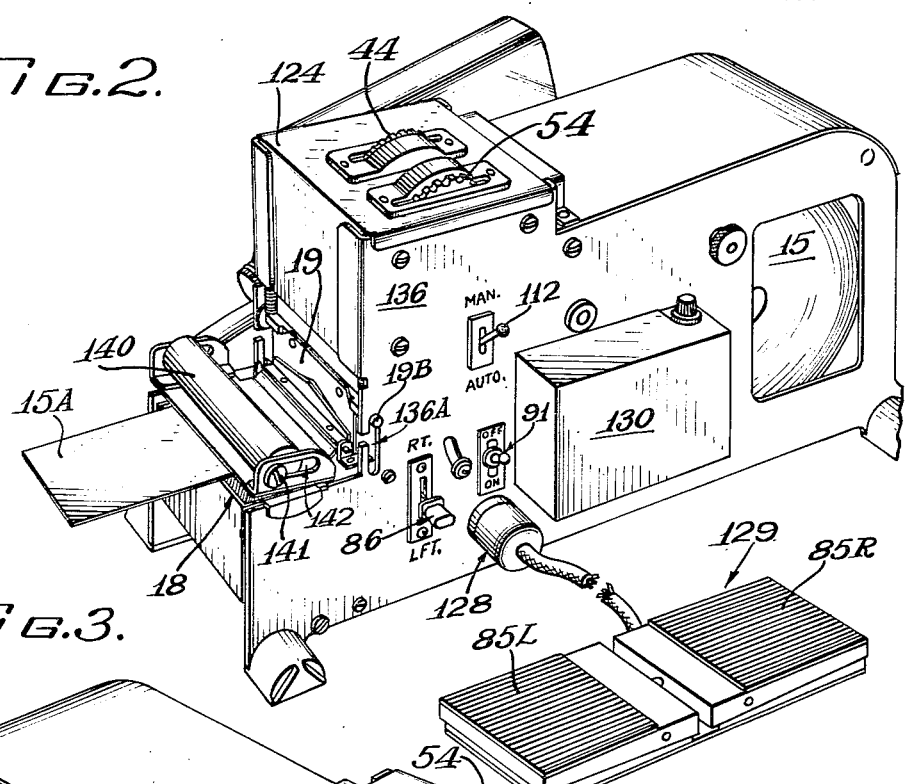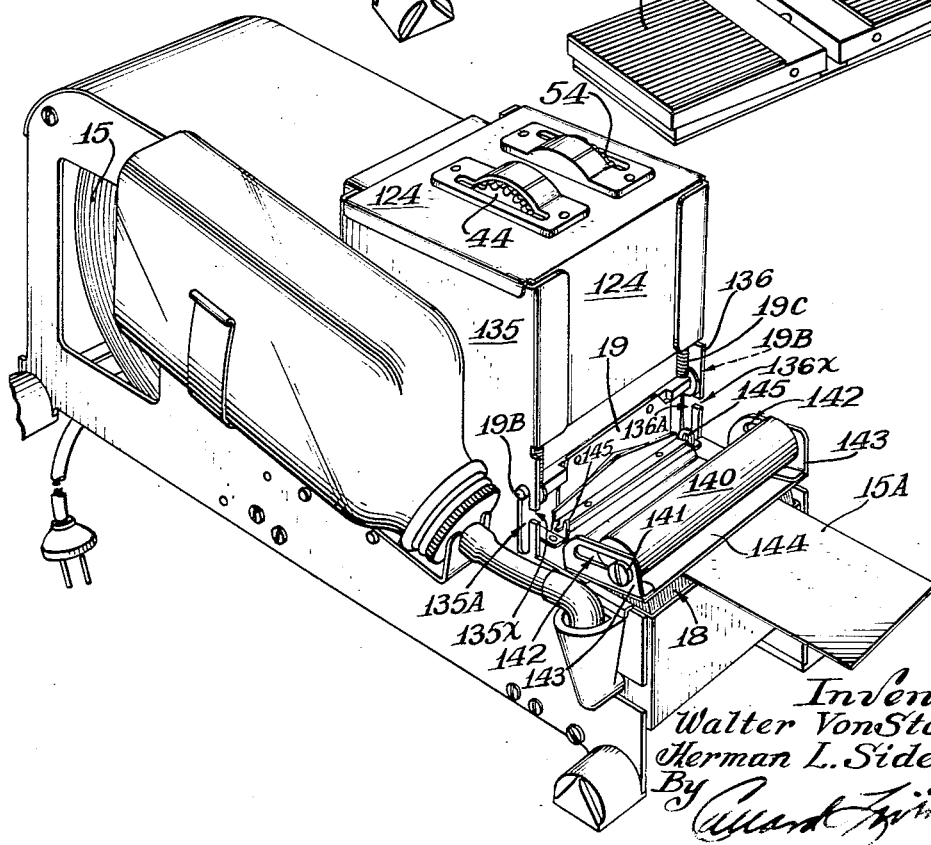

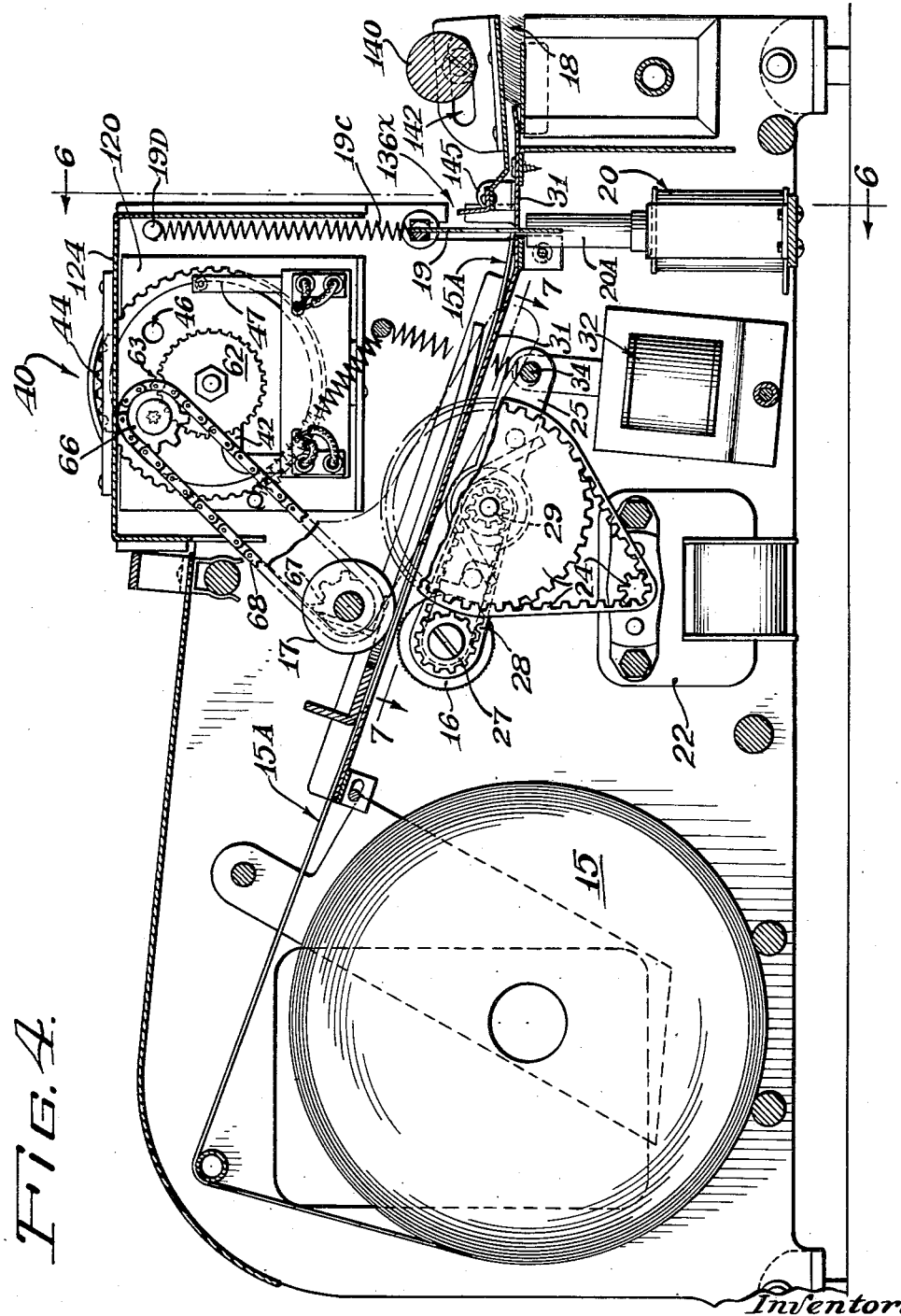

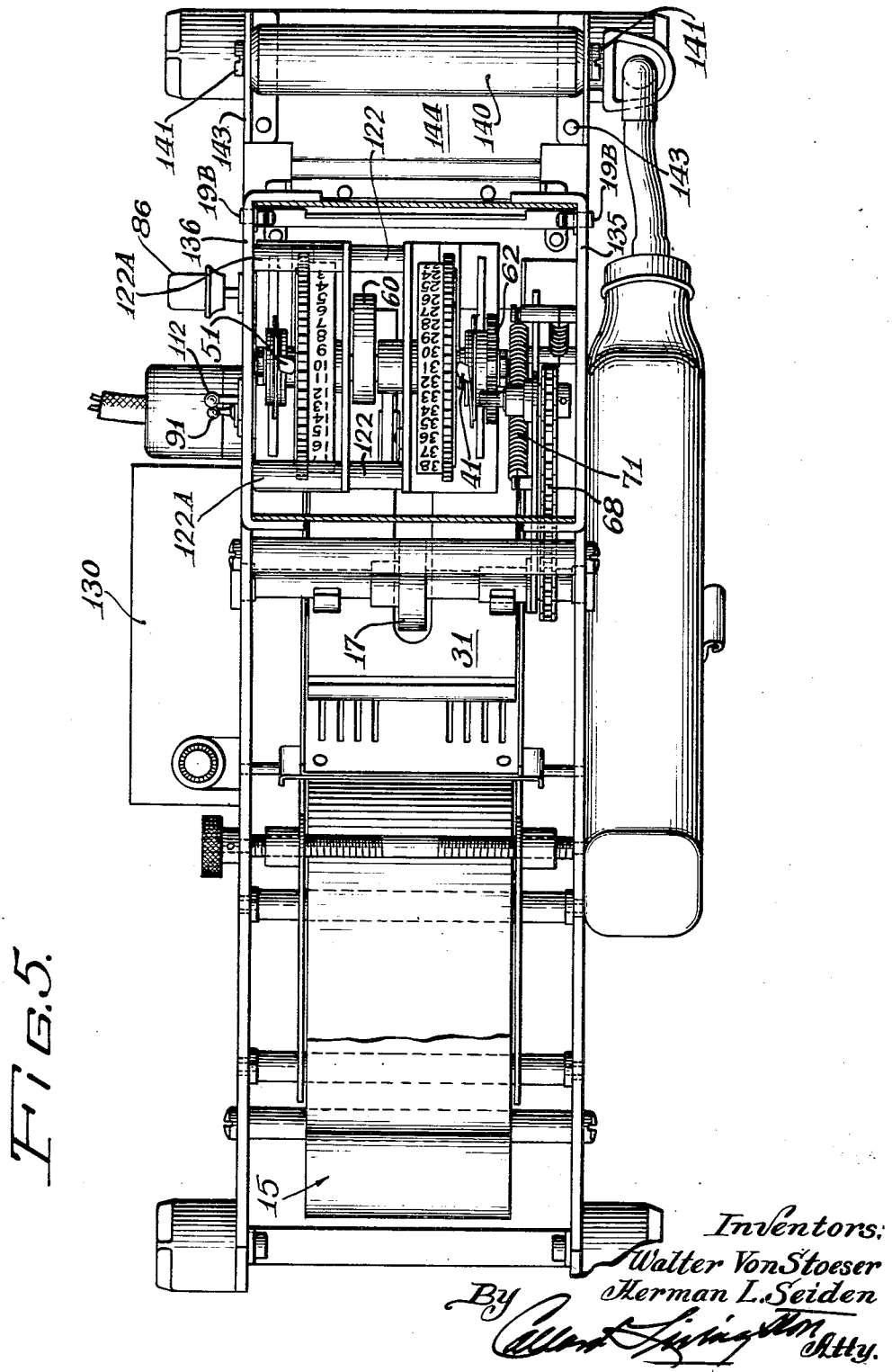

March 19, 1957 W. VON STOESER ET AL 2,785,748
MEASURING TAPE FEED
Filed Nov. 10, 1952 6 Sheets-Sheet 6

Inventors:
Walter Von Stoeser
Herman L. Seiden
By
Atty.

United States Patent Office 2,785,748
Patented Mar. 19, 1957

2,785,748

MEASURING TAPE FEED

Walter Von Stoeser, Lake Villa, and Herman L. Seiden, Chicago, Ill., assignors to Lectromatic Devices, Inc., a corporation of Illinois Application November 10, 1952, Serial No. 319,672

10 Claims. (Cl. 164—49)

This invention has as its principal object the provision of improvements in automatic electric tape feeders for serving either preselectively measured or random lengths of gummed tape for packaging and like purposes.

Among the more detailed objects and features of the device disclosed herein are the provision of two preselecting dials which may be set to determine two different measured lengths of tape to be fed, depending upon which of certain selecting switches is operated by the attendant; also, a switch and circuit means for rendering the device fully automatic to feed the lengths preselected by either dial, or to render the device semi-automatic so that one dial is effective to control the feeding of preselected lengths, while the other dial control circuit is conditioned to feed so-called random lengths in which the feeding of the tape will be continuous and can be started and stopped at the discretion of the operator.

A further object is the provision of improvements in a preselecting dial mechanism which is actuated by power derived from a tape-feeding motor means, and which includes a mutilated gear means for driving a measuring switch through a certain cycle.

Another object is the provision of additional measuring control means in a tape dispenser of the type disclosed in the copending application of Walter Von Stoeser, Serial No. 168,565, filed June 16, 1950, now Patent No. 2,743,861, for the purpose of expanding the range and accuracy of the measuring operations.

Additional objects relate to the provision of a novel power take-off structure cooperable with a motor-driven tape-serving means for driving one or more rotary measuring switches; circuit means for selectively including or excluding one or two measuring switches from the measuring circuit which controls the tape-feeding means, so that measured or random lengths of tape may be fed at the discretion of the operator; together with improvements in details of a knife structure for the tape-shearing means, as well as improvements in other components of the illustrative embodiment shown, all of which will become apparent as the following description proceeds in view of the annexed drawings, in which:

Fig. 1 is a skeletonized pictorial plan of the principal working elements of the new tape feed shown in conjunction with control-circuit means therefor;

Fig. 2 is a perspective view of the tape machine including the foot switch;

Fig. 3 is another perspective of the machine viewed from the side opposite that shown in Fig. 2;

Fig. 4 is a vertical section through the machine;

Fig. 5 is a top plan view of the machine with the top cover plates removed;

Figure 6:
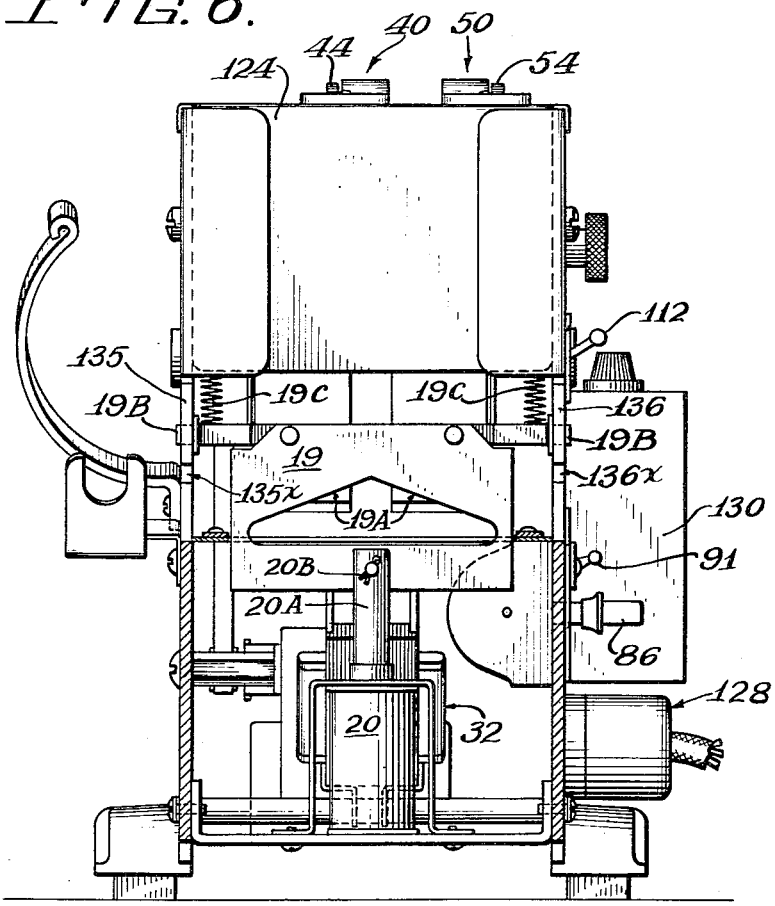
Fig. 6 is a vertical sectional detail taken along lines 6—6 of Fig. 4, with parts shown in elevation, including particularly the cutter or shear plate and operating solenoid therefor.

In its broader aspects, the character and mode of operation of the new tape feed is best understood by reference to the schematic showing of Fig. 1, wherein a roll 15 of gummed paper tape has its web 15A fed between feed rollers 16 and 17 operating to pass the web over a moistening brush 18 for subsequent severance by a shearing blade or cutter 19 adapted to be actuated by a solenoid 20.

Means for feeding the tape includes a motor 22 driving a countershaft 23 through belt and pulley means 24, it being noted that the countershaft 23 has pivoted thereon a rockable arm 25 at one end of which is journaled a stub shaft 26 upon which the lower or driving feed roller 16 is fast along with a pulley 27 driven by a belt 28 which in turn is driven by another pulley 29 on shaft 23. This arrangement constitutes a rockable feed roller means which may be rocked clockwise to cause the feed roller 16 to rise against the tape web and press the latter against the companion roller 17 so as to seize and feed the web.

Means for normalizing and rocking the feed roller includes an operating yoke 33 attached to the plunger of a solenoid 32 and engaging a cross-pin 34 which also traverses an end of the rocker arm 25, and which is pulled upwardly by coil springs 35 to normalize the rocker and feed roller in a normal condition in which the feed roller 16 is out of engagement with the tape web.

Fig. 4 depicts the actual disposition of parts in the aforesaid arrangement of the feed roller means 16—17; moistening brush means 18; cutter blade and cutter solenoid 19—20; feed motor 22; rocker arm 25 and rocking solenoid 32, all shown in Fig. 4 in compact installation beneath a tape bed plate structure 31 upon which the tape web 15A is fed from the supply roll 15.

The belt and pulley means 24 (and 27—28—29) are preferably of the gear-toothed rubber belt variety for quiet operation and accurate tracking. The compact arrangement of parts of the aforesaid mechanism is also seen in Fig. 7 looking down from a level beneath the tape bed plate.

Figure 7:
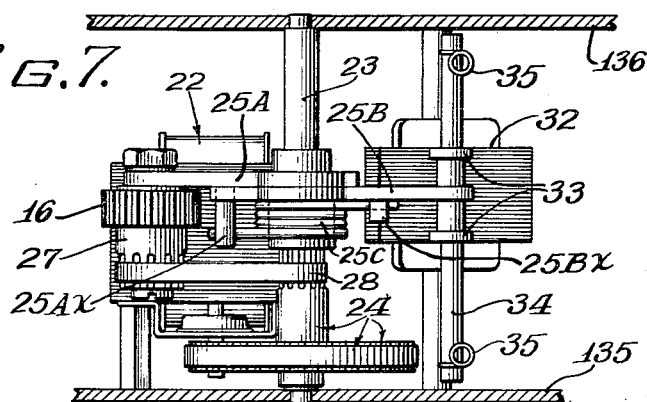
Fig. 7 is a horizontal sectional detail taken along lines 7—7 of Fig. 4 to show in plan the tape-feeding means and operating solenoid therefor.

In the actual construction of the rocking feed roller means, as seen in Fig. 7, the rocker arm 25 is preferably a yieldable two-piece device consisting of a pair of arms 25A, 25B, both pivotally carried on shaft 23 and maintained in a normal condition of alignment by means of a stiff spring 25C having opposite ends bearing against pins 25AX and 25BX projecting respectively from the two arm sections 25A and 25B, it being noted in Fig. 7 that the pin 25AX is disposed to be engaged by an end portion of the arm section 25B to limit the movement of the latter by the spring. Thus, the rocking feed-roller arm structure 25 is yieldable in one direction so that the feed roller 16 is in effect disposed to yield when rocking up against the tape web to press the latter against the companion feed roller 17.

Reverting to the schematic showing of Fig. 1, measuring switch means for preselectively determining the length of tape to be fed includes a pair of adjustable rotary switch devices of identical construction such that the detailed description of one will suffice for both.

Measuring switch 40 includes a rotary contact 41 fast on a driven shaft 39, common to both measuring switches. A wiper contact 42 bears on the hub portion of contact 41 to extend connection to a control circuit.

A dial member of insulating material includes a drum part 43 on which is displayed a sequence of length-indicating numerals designating the number of inches of tape to be fed; and the dial further includes a knurled rim portion 44 to be engaged by the fingers for turning the dial to select a desired length of tape to be fed, the dials 40 and 50 being freely rotatable on shaft 39 so as to rotate relative to their respective rotary contacts 41 or 51.

Carried on the ends of each dial is a circular contact plate 45 or 55, in each of which is an interruption or hole 46 or 56 into which the ends of the respective rotary contacts 41 or 51 can lodge so as to be electrically disengaged from, or out of circuit-completing engagement with the corresponding dial contact plate 45 or 55.

A plate contacting wiper 47 rides on the plate 45 to extend a connection from the latter to a control circuit; and the dial switch has a similar wiper contact 57 for a like purpose.

A clock spring 60 is engaged with shaft 39 to turn the latter to a starting position and thereby dispose the rotary contacts 41 and 51 in identical angular starting positions relative to their respective dials and associated contact plates 45 and 55.

Figure 8:
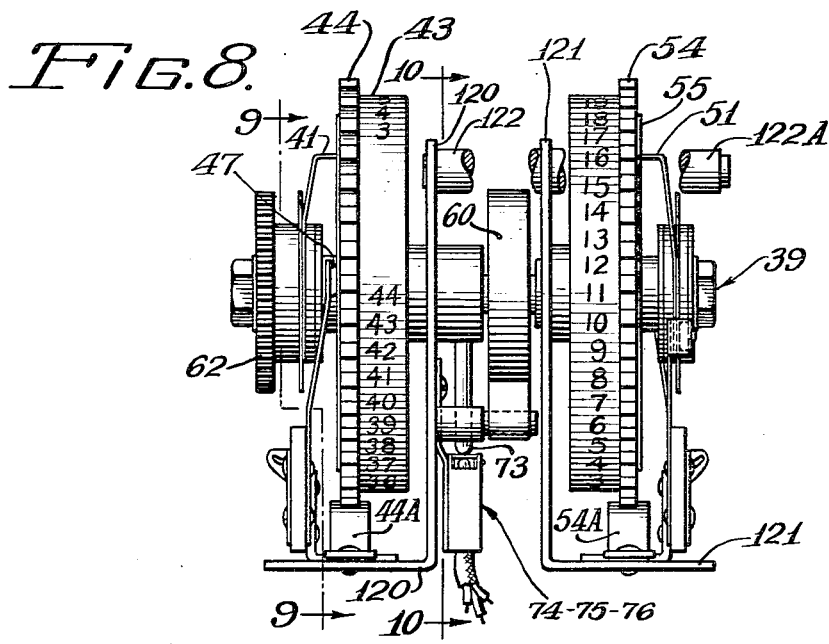
Fig. 8 is a front elevational detail, to enlarged scale, of the dual measuring switch unit.
Figure 9:
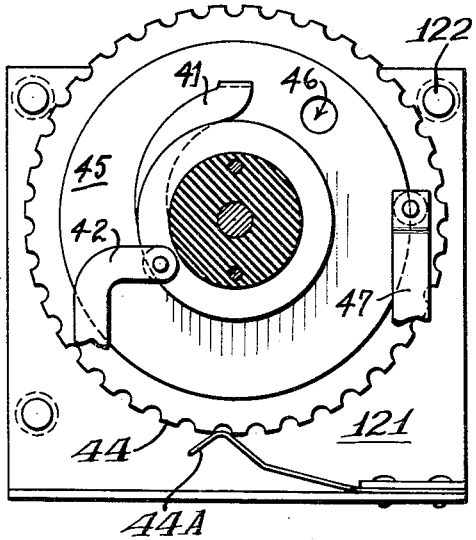
Fig. 9 is a vertical sectional detail taken along lines 9—9 of Fig. 8 and showing parts of the rotary measuring contact means in elevation.
Figure 10:
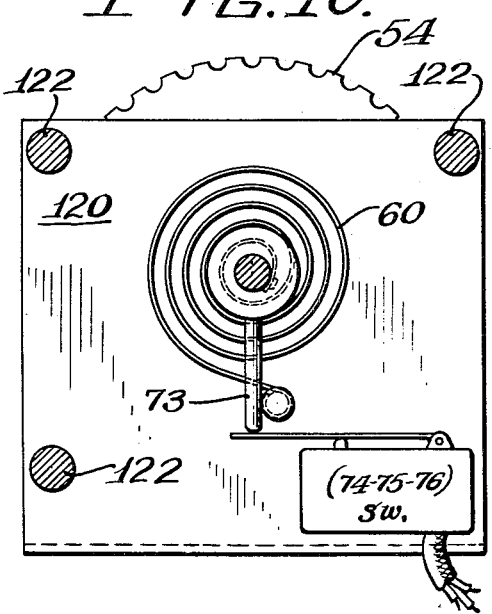
Fig. 10 is a vertical sectional detail taken along lines 10—10 of Fig. 8 with parts of the reset switch and spring shown in elevation.

The two measuring switch units 40 and 50, as well as the resetting or indexing clock-spring means, and a reset switch means (to be described hereafter) are, in practice, made as a subassembly unit, the actual construction being that depicted in Figs. 8 to 10 wherein the reference characters correspond to those of Fig. 1 and designate the parts of the actual embodiments of the elements shown in Fig. 1.

A top view (with cover plate removal) of this measuring switch subassembly is also shown to advantage in Fig. 5 in its assembled relation to other parts of the actual machine.

Continuing with reference to Fig. 1, means for rotating the shaft 39 a certain angular amount, slightly less than one full revolution, includes a driven, mutilated gear 62 having an enlarged drop-out depression 63 in its toothed periphery which is of sufficient depth to receive therein a radially rockable driving pinion 64 when the latter is engaged with the teeth of driven measuring gear 62, and turns the latter until the drop-out interruption 63 confronts said pinion, so that the latter can drop from engagement with the gear teeth to discontinue rotation of the measuring shaft without permitting the latter to be returned by the clock spring.

Means for rockably mounting the pinion 64 includes a bell crank or like offset lever 69 freely pivoted on shaft 17A, which carries the tape feed presser-roller 17, so that shaft 17A is turned by the rotation of presser roller 17 as the tape web is advanced by the feeding roller 16.

The pinion 64 is mounted on a stub shaft 65 journaled in one of the offset ends of the crank lever 69, and has a gear 66 driven from a gear 67 on the presser-roller shaft 17A through a chain belt means 68.

The remaining offset end 69A of the crank lever overlies an extended portion of the yoke pin 34A and bears upon the latter under urgence of spring 71.

When the feed rock shaft means 25 is rocked by action of feed solenoid 32, yoke-pin portion 34A goes down, permitting spring 71 to rock the lever 69 so as to thrust the pinion 64 into mesh with gear 62; and as the advancing tape web rotates the tracking and presser-roller 17, pinion 64 turns gear 62 and hence measuring shaft 39, so that the rotary wipers 41 and 51 travel around the dial contact plates 45 and 55 until the stopping circuit interruptions or holes 46 and 56 thereof are encountered, whereupon the feeding will be automatically stopped and the shear means 19—20 will be actuated by circuit connections to be described hereafter.

It may be observed meanwhile that the measuring shaft 39 in Fig. 1 is presumed to be in a starting or reset position in which it operates certain reset switch means including a reset pin 73 fast on shaft 39 and projecting radially to engage the operating projection 74A of a spring switch blade 74 and press the latter down into contact with another blade switch contact 75.

The first contact 74 is mechanically tied to a third contact blade 76, so that the latter remains disengaged from contact 75 when contact 74 is closed with contact 75.

The operation of the reset switch is such that upon turning of pin 73 out of engagement with switch operating part 74A, when the measuring shaft 39 turns away from starting position, relay control contacts 74—75 will separate and be in open circuit relation while the cutter or shear contacts 75—76 will engage and remain closed until the reset pin returns in the return or indexing operation of shaft 39 under urgence of the clock spring 60.

The circuit connections for full automatic or part automatic and part random (i. e. manual) operation include relay and feed switch means cooperable to cause the feeding motor 22 to run until the measured amount of tape is fed out on the automatic cycle, or until the operator releases the feed switch means after the desired length of tape has been fed, the cutter or shear means 19—20 being automatically operated thereafter, in either case, when the reset switch means is closed upon indexing or returning the shaft 39, and hence reset pin 73 to normal starting or indexed position.

The tape feeding mechanism is controlled either by a foot switch or a manual switch, at the option of the operator, and both said switches are arranged to selectively control the two rotary measuring switches 40 and 50, which are also referred to as the "right" (dial) and "left" (dial) switches, for reasons to appear.

In Fig. 1 the foot switch means includes a pair of contacts 81—82 for the left foot switch, and another pair 83—84 for the right foot switch, the same being respectively actuated by treadles 85L and 85R.

Connected in parallel with the foot switch means is a manual switch means including movable contact 86, "left" contact 87, and "right" contact 88.

Operating power is connected to conductors 89 and 90 from the usual 110 v. outlet, there being a master "on-off" switch 91 in this circuit to open and close the feed conductor 90, which is connected to one terminal each of the motor 22, feed solenoid 32, and shear solenoid 20, respectively, by conductors 92, 93, 94.

Feed conductor 90 also connects via conductor 95 to one terminal of the coil 96 of what is termed the "left" relay; and by conductor 97 to one terminal of the coil 98 of a "right" relay.

For full automatic operation, the circuit condition is as shown in Fig. 1; and to operate under control of the left measuring dial, the left foot switch treadle 85L is depressed to close contacts 81, 82; this will connect power via conductor 95A, from contact 82 through contact 81, to energize the left relay coil 96.

Power at contact 82 for the operation is derived from conductor 100 via conductor 100A, which is common to both contacts 82, 83 of the foot switch.

It may also be observed here that the manual feed switch is in parallel with the foot switch, that is contact 86 is also connected to conductor 100, and the manual left contact 87 is connected by conductor 87A to relay lead 95A in common with left foot-switch contact 81, while the right manual-switch conact 88 is looped to the right foot-switch contact 84 by conductor 88A, and via conductor 97A to the right relay coil 98. Thus, either the manual or the foot feed switch will selectively operate the right or left relays.

To complete the aforesaid power circuit from the optionally-operable manual or foot switch and operate the right or left relays to start the feeding operation, the conductor 100 terminates at reset switch contact 74, normally closed with contact 75, connected via conductor 101 to right relay contact 98A, which is normally closed with a companion contact 98B.

Contact 98B is looped to left relay contact 96A, likewise normally closed with a companion contact 96B, which connects to the return power line lead 89.

Thus, the first thing to happen when the feed switches (manual or pedal) are actuated left or right, is to energize, correspondingly, the left or right relay coils 96 or 98.

As soon as either of the right or left relays pulls up the feeding motor 22 will start, by reason of connection of conductor 103 to the return power conductor 89 by relay contacts 96B—96C, assuming the left relay to be the one operated; or by contacts 98B—98C, if the right relay is the one operated.

When the feed motor starts, as aforesaid, the measuring shaft 39 will likewise depart from starting position, and the reset pin 73 will leave the reset switch means 74—75—76 so that the feed-switch supervisory contacts 74—75 open and the shear-switch supervisory contacts 75—76 close.

At this time the feed switch means 81—82—83—84 and 86—87—88 are disabled, and the relays cannot be again energized until the machine has completed the initial cycle and the measuring switch means has been reset or indexed, as by restoration of shaft 39 to starting position, and operation of the reset switch to again close the supervisory relay contacts 74—75.

The operation being described is "automatic," and it is assumed that the two dial switches 40 and 50 have been pre-set by the operator to give the desired lengths of tape. To get the length governed by the left dial, the left feed-switch means and hence the left relay 96 must be operated; and to get the length indicated on the right dial, the right feed-switch means and right relay 98 must be operated.

Whichever relay is operated, the feed motor starts, as aforesaid, and supervisory relay contacts 74—75 open, so that power is disconnected from the relay coils 96 or 98 even though the feed switches may be held closed.

However, each relay has a holding circuit for the automatic operation.

If the left relay pulls up its contacts 96D and 96E close, so that the coil 96 is furnished a power connection via measuring-switch conductor 104 through left rotary dial switch connections 41, 42, 45, 47; thence via conductor 105 to the bottom left-relay contact 96C (now closed with contact 96B) to power conductor 89.

If the right-dial switch is the one in use then the holding circuit for the right relay would be completed at holding contacts 98D—98E; through closed selector switch contact means 106—107, conductor 108, right measuring or dial switch contact means 51, 52, 55, 57, conductor 109 to conductor 105, and through right relay contacts 98B, 98C, now closed, and thence through the left relay normally closed contacts 96A, 96B to power lead 89; it being noted the right relay contact 98B is looped to left relay contact 96A, and that when the right relay is pulled up, the left relay is normal, and vice versa.

Whichever dial switch, left or right, is selectively used by the operator, the corresponding relay, left or right, will be dropped out at its holding circuit contacts 96D—96E or 98D—98E, when the appertaining dial switch has tolled off the preselected length of tape and the measuring contacts 41 or 51 lodge upon their respective circuit interrupting parts 46 or 56.

As soon as the relays drop out upon opening of their holding circuits, as aforesaid, power is disconnected from the motor and tape-feeding solenoid conductor 103 by opening of relay contacts 96B—96C or 98B—98C, so that the rockable pinion means 64 disengages the measuring shaft gear 63 and the shaft 39 is free to be restored to index or starting position by clock-spring 60 to operate the reset switch.

However, before the reset switch can be actuated by the reset pin 73 the operated relay will have been dropped out or restored to normal, so that the respective left and right relay contact sets 96A—96B or 98A—98B will again be closed, as the case may be, with the result that power is now momentarily derived from conductor 101 (via 89 through normals 96A, 96B or 98A, 98B) and the now reclosed supervisory cutter contacts 75—76, and conductor 110 to shear coil 20, so that the knife means 19 will snap down to sever the tape web in the short interval during which the reset pin 73 is turning back to normal starting position where it will again open shear contacts 75—76 so that the cutter knife 19 will be quickly restored to normal.

Thus, dropping out of either control relay causes operation of the tape cutting means by reason of the relative delay in the restoration of the relays and the supervisory reset switch means to normal starting condition.

The operations described thus far have been "automatic" in the sense that both of the measuring-switch devices 40 and 50 are optionally involved in the feeding process; but selector-switch and circuit means are provided so that only one of the dial switches (preferably the left one) is available for automatic measuring, while the other dial switch and its associated relay means is converted for operation to feed the tape continuously for random lengths, so long as the feed switch means is held operated by the attendant.

This mode of operation is referred to as "semi-automatic" or "manual."

In order to change the circuits for semi-automatic operation it is merely necessary to throw the selector switch operating member 112 to "man." position, toward the left in Fig. 1 (or upwardly in the commercial embodiment as seen in Fig. 2). This will open the contacts 106—107, thus disabling the holding circuit for the right relay by disconnecting the measuring switch and its conductor 108 from right holding contact 98D.

But as a further result of the aforesaid operation of the selector switch, its contacts 114—115 will be closed, thereby connecting the conductor 100 directly to the return power lead 89 via conductor 100A, said selector switch contacts 114—115 closed, conductor 116 and the normally closed left relay contacts 98A—98B, so that even though the supervisory reset contacts 74—75 open when the tape feeding starts, these supervisory contacts are shunted by selector switch contacts 114—115 so that the right relay coil 98 can be held energized so long as either the right manual or pedal feed switch is held closed.

After the operator releases the feed switch for a random-length feeding operation involving the right relay, as aforesaid, the cutter operates automatically, as in the full automatic operation, since the supervisory shear contacts 75—76 of the reset switch are delayed in opening, as usual, until after the right relay contacts 98A—98B have closed, so that the shear coil 20 will be energized briefly during the delay interval until the shear contacts 75—76 are opened to normal starting condition.

In the commercial embodiment of the device, the measuring switch means generally designated at 40, 50, in Fig. 1, is preferably constructed as a sub-assembly according to the construction shown in Fig. 8, wherein the measuring shaft 39 is journaled between a pair of angle brackets 120, 121, joined by tie-rod means 122, with the indexing spring 60 and the supervisory reset switch means 73, 74, 75, 76, situated between the two angle brackets. Additional views of some of these details appear in Figs. 9 and 10.

It will also be noted from Figs. 8 and 9 that each of the selector dials or drums is provided with detent means in the form of a spring finger 44A or 54A, respectively engageable with the knurled rims 44 or 54 of the dials.

The measuring switch subassembly is mounted in the machine (as shown in Fig. 5) by means of additional tie rods 122A secured to the machine frame, and situated adjacent an open top portion of the latter so that the knurled edges 44 and 54 of the two dials can project upwardly through suitable openings in a small, removable cover plate 124 (as in Figs. 2 and 3).

As viewed in Fig. 2, the remaining control instrumentalities, with the exception of the foot switches, are mounted on a side wall of the machine, and include the master on-off switch 91, the right-left dial selector switch 86, and the selector switch 112 for full automatic or random feed. In addition, there is provided a plug means 128 for connecting the foot switch unit 129 in parallel with the operating switch 86. The two foot switches 81—82 and 83—84 (of Fig. 1) are contained (not shown) within the unit 129 and are respectively actuated by the treadles 85L and 85R thereof.

The two "left" and "right" control relays 96, 98, etc. (of Fig. 1) are preferably contained in a small barnacle housing 130 secured to the side of the machine (as in Fig. 2).

A mechanical feature of importance relates to the mounting of the web shear or cut-off knife 19 as an easily removable element. In Fig. 6, the knife 19 is seen as a plate having a triangular cut-out, of which the two top angular margins 19A are sharpened shearing edges. The plunger 20A of the solenoid is removably attached centrally at the bottom edge of the shear plate by a cotter pin 20B.

Rigidly attached to the top edge of the shear plate is a horizontal guide bar having opposite ends 19B projecting beyond the side margins of the shear plate and also slightly beyond the side wall plates 135, 136 of the machine frame (as in Figs. 3 and 6).

Attached to the horizontal guide bar near the projecting ends 19B thereof are the lower ends of a pair of lifting or normalizing springs 19C (Fig. 6) having their respective upper ends anchored on pins in the frame plates, as at 19D (Fig. 4). These springs elevate the knife 19 to its normal position so that the tape web passes through the triangular cut-out to pass beneath a hold-down roller 140 and over the moistening brush means 18 (Figs. 1, 2, 3).

The projecting ends 19B of the guide bar on the knife plate respectively work in vertical slots 135A, 136A in the frame wall plates (as shown best in Fig. 3); and these two vertical slots each have a laterally-opening passage 135X or 136X (as in Fig. 3), through which the projecting ends 19B of the guide bar can pass to remove the shear plate.

The knife guide bar ends working in the vertical slots 135A, 136A, guides the upper edge of the knife plate, while the lower edge thereof is guided by its attachment to solenoid plunger 20A; and the two normalizing or lifting springs 19C are biased inwardly of the machine so as to cause the guide bar ends 19B to ride against the inward margins of the vertical slots, away from the lateral release passages 135X, 136X.

Thus, the knife plate, under urgence of the lifting springs 19C and the solenoid plunger 20A (Fig. 6), will reciprocate in a vertical plane, but may be removed by manually aligning the ends 19B with the lateral release passages, after disconnecting the solenoid plunger; and the shear or knife plate 19 can then be removed from the machine, the springs being released either at their upper or lower ends for this purpose. This feature is of importance for the reason that paper-cutting knives in such machines require sharpening or removal frequently for best performance, and the described construction facilitates such removal while affording a simple but rugged mounting to withstand the repeated hammering which reciprocable cutters of this class must take.

Another mechanical feature of importance is the adjustable hold-down weight shown in Fig. 3, and which includes a heavy metal cylinder 140 having at each of its axial ends an eccentric pivot, such as the screws 141 (Fig. 5). These pivots respectively engage in a horizontal slot 142 in an end bracket 143 secured to a tape presser plate 144 having at the opposite ends of its inner transverse edge a pair of pivot lugs removably seating in ears 145, so that the presser plate can pivot upwardly away from the tape web 15A and brush means 18.

Moreover, by reason of the elongation of the slots 142, the weight pivot screws 141 can be moved back and forth to position the weight of the hold-down cylinder back and forth in the direction of travel of the end of the tape web across the brush; and additional adjustment may be had by turning the cylinder about the eccentric pivots 141 so as to extend the range of such back and forth positioning of the weight.

In addition to the foregoing structural and functional novelties of the compact, efficient, and flexible tape-feeding mechanism hereinabove described, the device is substantially free from jamming of the paper web in the cutter mechanism. Such jamming has been a source of great trouble with prior devices of this class, owing to the problem which arises from a necessity for precise timing, under all conditions, of the actuation of the cut-off knife with the stoppage of the tape web.

The momentum of the advancing tape and unwinding of the supply roll commonly causes the tape to pile up behind the knife or shear if the latter engages the tape while it is still advancing, and invariably this produces such a jamming at the knife that considerable delay and annoyance is caused in removing the jammed section of tape and restarting the web.

Moreover, variables, such as differences in thickness of the tape, or the adhesive layer thereon, and the continuously diminishing size and weight of the supply roll, can operate at different times to defeat most arrangements for timing the cut-off action.

In the present device, jamming is practically eliminated by reason of the cofunctioning of the feed roller means 16 and the rotary measuring switch shaft 39 through the unidirectional gear drive means 62, 64, and common control means for the feed roller means and gear drive, including the solenoid 20 and rocker means 34, 69A.

Thus, when the feed roller 16 is rendered ineffective for further feeding, the unidirectional gear means is concomitantly caused to release the measuring switch shaft, but the cut-off still cannot occur until the switch shaft 39 has returned to its index or starting position.

Prior devices which depend upon stopping a main feed motor, or marginal adjustment of relays to control the momentum factor, are not uniformly reliable for changes in such variables as tape or glue thickness, roll weight, excessive changes in humidity or temperature, line voltage fluctuation, etc.; whereas, the present device operates dependably and rapidly through all variations of such factors, whether the length of the fed strip is long or short.

Another advantage flowing from the new measuring switch and feed control means is that of more accurate tracking, by which is meant the uniformity with which the measuring shaft rotates in step with the advance of the tape. Over- (or under-) feeding of tape is reduced on the average to less than one-half inch of tape per gear tooth, referring to the meshing of the coupling or interconnecting gear means 62—64. Thus, the probable error in measured length of tape will generally not be more than plus or minus one-half inch due to any lag or override in meshing or disengagement of gears 62—64 in step with movements of the tape.

We claim:

1. In an electrically powered and controlled tape dispenser of the type including tape-feeding roller means shiftable to feedingly engage and disengage a tape, with a driving motor for the roller means and an electrically operated tape cutter, control improvements, comprising: an adjustable measuring switch having traveling contact means spring-urged to a starting position and cooperating adjustable contact means selectively positionable to be engaged by the traveling contact means; shiftable gear means driving said movable contact means away from said starting position and including a first and shiftable gear driven by a tracking roller which is driven from said tape web in feeding motion thereof commensurately with the length of tape fed, and a second gear drivingly interconnected with said traveling contact means, said first gear being shaftable to engage and drive said second gear; feed-control means for shifting said roller means as aforesaid; and means operatively interconnecting said feed-control means and said shiftable gear for coaction to effect driving of the second gear by the first gear substantially simultaneously with shifting of the roller means to feed the tape web, and conversely to stop said driving of the gears responsive to shifting of the roller means to stop feeding of the web.

2. In an electrically operated tape-feeding machine, electrically actuated means for feeding out a tape web; a measuring switch including rotatable measuring contact means movable relative to adjustable contact means; drive means for said rotatable contact means including a driving member and a companion driven member, one of which companion members is movable into and out of driving relation to the other; means including a tape-driven member engaging the fed tape to be driven thereby for actuating said driving companion member; means cooperable with said tape-feeding means for moving the movable one of said companion members into driving engagement with the other said companion member concomitantly with the commencement of feeding action of said feeding means, and for operatively disengaging said companion members concomitantly with discontinuance of feeding action of said feeding means, whereby to start and stop rotation of the rotatable contact means in step correspondingly with the starting and stopping of feeding of said tape; together with control-circuit means including a starting switch, said rotatable measuring contact means, and relay means connected to actuate said feeding means, and start the feeding of tape, and to further actuate said feeding means to stop said feeding action responsive to predetermined amounts of rotation of said rotatable contact means relative to said adjustable contact means; and means yieldingly acting upon said rotatable contact means in opposition to said drive means to restore said rotatable contact means to a starting position relative to said adjustable contact means automatically upon disengagement of said driving and driven members of the drive means.

3. In an electric tape feeder, in combination, a pair of tape-feeding rollers and roller-control means for moving at least one of the same into and out of tracking engagement with a tape web to be fed thereby; a pre-selecting measuring switch including a rotary contact and drive shaft means therefor; spring means turning said drive shaft means into a starting position; an index switch operated by means positioned by said drive shaft means in said starting position; coupling means shiftable to drivingly couple and uncouple one of said feeding rollers with said drive shaft means; mechanism cooperable with said roller control means to shift said coupling means concomitantly with movements of said tracking roller by said control means into and out of tracking engagement with said tape web; an electric motor driving at least one of said rollers; an electrically-operated cutter for said tape web; and circuit means and connections therefor including a starting switch, said measuring switch contact, and said index switch for energizing said motor and actuating in sequence said roller control means to move said tracking roller into tracking engagement with the tape web and to move said rotary measuring contact in measuring operation, and thereafter to effect movement of the tracking roller out of engagement with the web when the preselected tape length is fed, and thereafter to shift said coupling means to release said drive shaft means from said driving interconnection with said roller means for restoration to said starting position, whereby to operate said index switch and actuate said cutter.

4. In an electrically operated tape-feeding machine, an adjustable measuring switch including rotatable measuring contact means; electrically actuated means for feeding tape and connected for control by said measuring switch dependently upon the amount of rotation of said rotatable contact means; drive means for said rotatable contact means including a driven member having driving connection with said contact means, and a complementary driving member, one of which members is movable into and out of driving relation to the other said member; means including a tracking member mounted for engagement with, and movable by, fed tape for supplying measured driving power to said driving member; power-driven feed roller means movable into and out of engagement with said tape on the side thereof opposite from said tracking member and acting to press the tape drivingly against the latter and effect feeding travel of the tape; and operator-controlled means for moving the feed roller means into and out of driving engagement with the tape jointly with movement of said driving and driven members correspondingly into and out of driving relation; whereby to start and stop rotation of the rotatable contact means in step with the starting and stopping of the feeding movement of the tape responsive to actuation of said operator-controlled means.

5. In a measuring-switch mechanism for electric tape-feeding machines, a measuring switch including an angularly adjustable contact and a cooperating rotatable measuring contact, connected in a tape-feed control circuit; first roller means mounted for driving engagement with a tape web to be fed and adapted to turn commensurately with the length of tape fed; a second and motor-driven roller means movable against said tape to press the same against said first roller means; restoring means yieldingly urging said rotatable contact means to a starting position; a gear having driving interconnection with said rotatable contact means; a pinion and shiftable means mounting the same for movement into and out of driving engagement with said gear; means including a linking device movable with said shiftable means providing a driving connection between said pinion and first roller means; electrically actuated means for moving said second roller means into and out of driving and pressing engagement with the tape web; and means operatively interconnecting said shiftable means and said electrically-actuated means for cooperation to shift said pinion into and out of driving engagement with said gear concomitantly with movement of said second roller means into and out of engagement with the tape web as aforesaid, said pinion and gear acting responsive to driving effort from said first roller means to turn said rotatable contact means away from said starting position, and said restoring means acting to return the rotatable contact means to starting position automatically responsive to disengagement of said pinion from said gear.

6. In an electrically-operated tape feeding machine, motor-driven tape feeding means including a driven feed roller mounted to rock into and out of feeding engagement with a tape web; a tracking roller mounted to engage and be rotated by said tape web; an adjustable measuring switch including a rotatable circuit-control member driven from said tracking roller; electrically operated feed-control means for rocking said feed roller into and out of feeding relation to said tape web; and a main control circuit including a starting switch means and said circuit-control member of the measuring switch connected to actuate said feed-control means in feeding operation responsive to operation of said starting switch means and to stop said feeding operation automatically under control of said measuring-switch control member.

7. Apparatus as set forth in claim 6 further characterized in that said tracking roller is coupled to said circuit-control member of the measuring switch through a driven gear, connected to drive the control member, and a driving pinion mounted to rock into and out of driving engagement with said driven gear, said pinion having a shiftable driving connecton with said tracking roller; together with means cooperable with said feed-control means for rocking said pinion into and out of driving engagement with said driven gear as a function respectively of the starting and stopping of the web feeding operations, as aforesaid, in the order named.

8. Apparatus as set forth in claim 7 and further characterized in that said driven gear of the coupling means includes a peripheral drop-out interruption into which said pinion moves in a certain angular position of said driven gear to stop the movements of the latter and said rotatable circuit control member at a predetermined position, while permitting said pinion to rotate idly in said drop out interruption.

9. In an electrically-operated tape feeding machine, motor-driven tape feeding means including a driven feed roller mounted to rock into and out of feeding engagement with a tape web; a tracking roller mounted to engage and be rotated by said tape web; an adjustable rotary measuring switch including an angularly movable switch element driven from said tracking roller; electrically operated feed-control means for rocking said feed roller into and out of feeding relation to said tape web; a main control circuit including a starting switch means and said angularly movable switch element of the measuring switch connected to actuate said feed-control means in feeding operation responsive to operation of said starting switch means and to stop said feeding operation automatically under control of said measuring switch at preselected angular positions of said angularly movable contact; and means coacting with said feed-control means for operatively interconnecting and disconnecting said rotary angularly movable switch element of the measuring switch with said tracking roller in substantial simultaneity with the engagement and disengagement of said feed roller with said tape web.

10. Apparatus according to claim 9 in which said starting switch means includes a manually operable switch and a foot switch connected in parallel for optional operation to start said feeding operation, and supervisory reset switch and relay means cooperable by connection controlled by said angularly movable switch element in a starting position of the latter to condition said manual and foot starting switch for effective operation, and disabling the latter switches from effective operation after said feeding operation has started, and further operating to recondition said manual and foot switches for effective operation again upon a resetting of said angularly movable switch element to said starting position, together with spring means acting against the driving effort of said pinion and gear to restore the angularly movable switch element to said starting position.

References Cited in the file of this patent
UNITED STATES PATENTS

| | | |
|---|---|---|
| 1,731,403 | Weaver | Oct. 15, 1929 |
| 1,732,635 | Chabot | Oct. 22, 1929 |
| 1,946,170 | Mikaekon | Feb. 6, 1934 |
| 1,960,945 | Krueger | May 29, 1934 |
| 2,065,939 | Landrock | Dec. 29, 1936 |
| 2,103,264 | Lorig | Dec. 28, 1937 |
| 2,133,868 | Morton | Oct. 18, 1938 |
| 2,298,492 | Longfield | Oct. 13, 1942 |
| 2,339,194 | Reichelt | Jan. 11, 1944 |
| 2,408,363 | Beckman et al. | Oct. 1, 1946 |
| 2,655,372 | Hempel | Oct. 13, 1953 |